United States Patent [19]

Schmidt et al.

[11] Patent Number: 5,005,963

[45] Date of Patent: * Apr. 9, 1991

[54] VEHICULAR MIRROR

[76] Inventors: William P. Schmidt, 21000 Woodruff, Rockwood, Mich. 48173; Franklin D. Hutchinson, 28000 Beel Road, New Boston, Mich. 48164

[*] Notice: The portion of the term of this patent subsequent to Jul. 3, 2007 has been disclaimed.

[21] Appl. No.: 361,334

[22] Filed: Jun. 5, 1989

Related U.S. Application Data

[63] Continuation-in-part of Ser. No. 254,027, Oct. 6, 1988, Pat. No. 4,938,578.

[51] Int. Cl.⁵ .............................................. G02B 5/10
[52] U.S. Cl. .................................... 350/629; 350/631
[58] Field of Search ........................ 350/629, 631, 632

[56] References Cited

U.S. PATENT DOCUMENTS

| | | | |
|---|---|---|---|
| 4,013,351 | 3/1977 | Haile | 350/632 |
| 4,436,372 | 3/1984 | Schmidt et al. | 350/629 |
| 4,512,634 | 4/1985 | Stout | 350/632 |

Primary Examiner—Paul M. Dzierzynski
Assistant Examiner—J. P. Ryan
Attorney, Agent, or Firm—Arnold S. Weintraub

[57] ABSTRACT

The mirror assembly of the present invention includes a frame which house the mirror, a mirror frame, a rigid tubular member, and means for mounting the mirror frame to the vehicle. The mirror assembly is for mounting onto an exterior front surface of a vehicle, preferably, in the shape of a one-fourth of an ellipsoid. The mirror surface is in the shape of a convex triangle, having a variable radius of curvature. The mirror is in the shape of a portion of a quadratic surface. The mirror is formed by the intersection of each of two parallel planes with the quadratic surface. The mirror surface has a plurality of radii of curvature. The mirror provides the driver of the vehicle with a field of view which is substantially greater than angle of the quadratic surface about a vertical axis. The top portion of the ellipsoid which provides a field of view over the driver, and the side of the ellipsoid which provides a field of view of the front of the vehicle are eliminated from the mirror surface. Hence, the portion of the ellipsoid that remains enabling the driver to view alongside the vehicle, can be effectively enlarged, while still providing a reduction in the size of the blindspot behind the mirror.

16 Claims, 4 Drawing Sheets

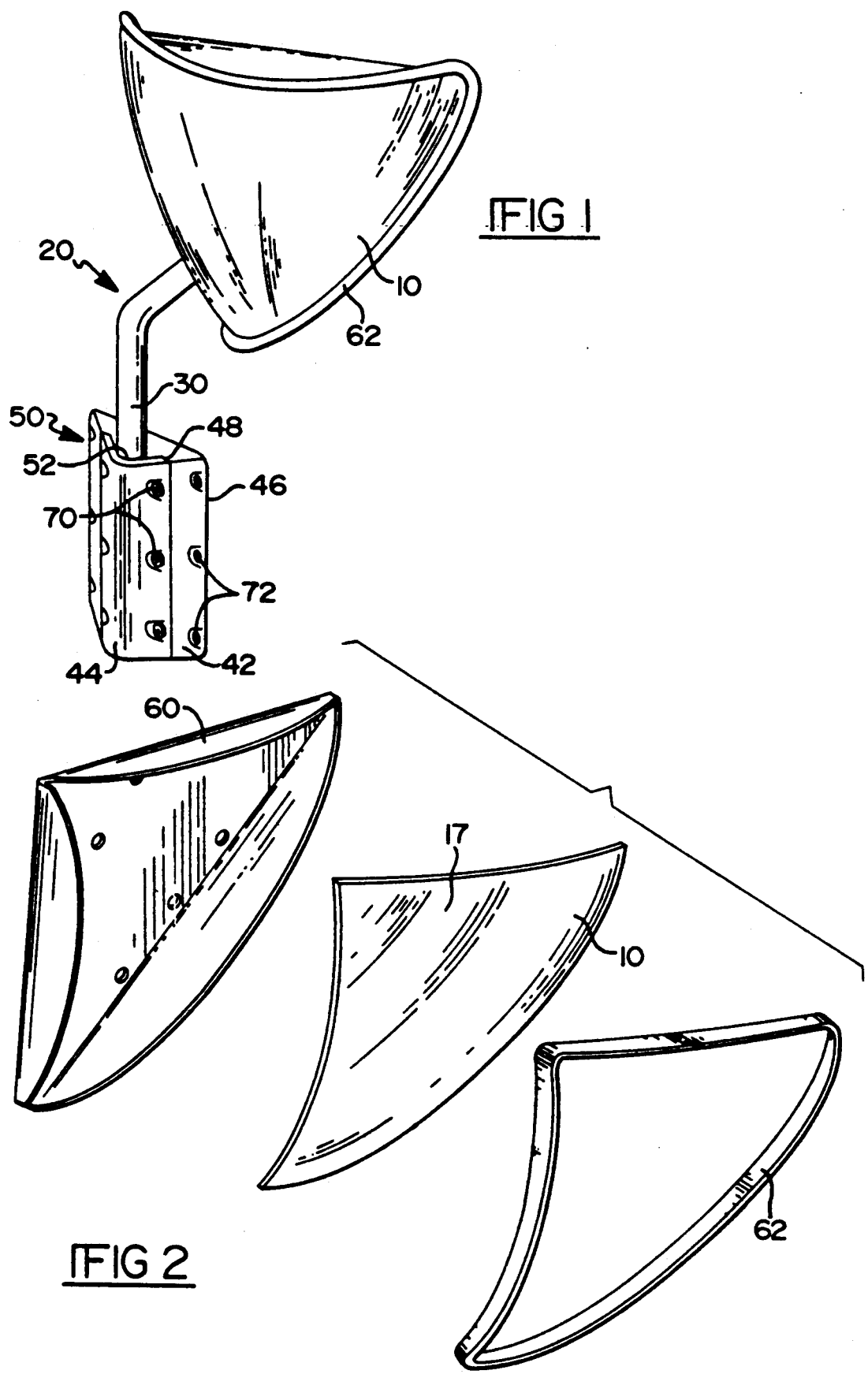

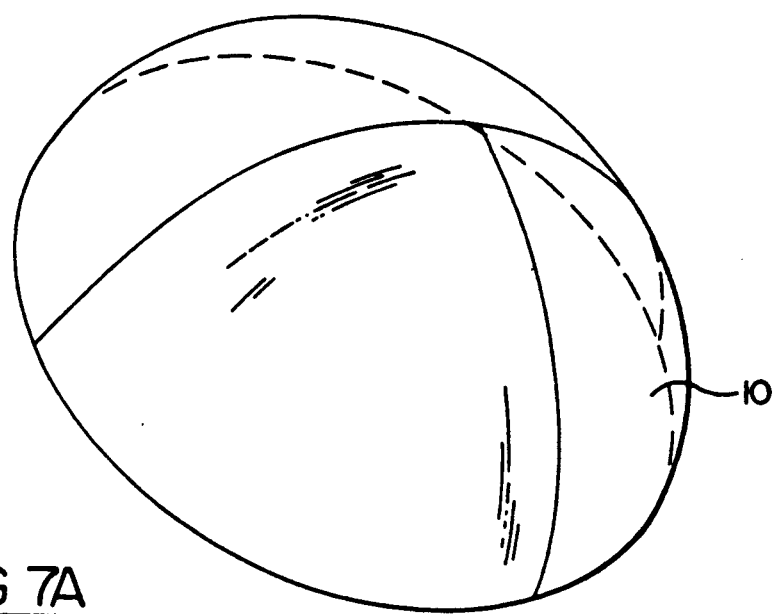
FIG 7A
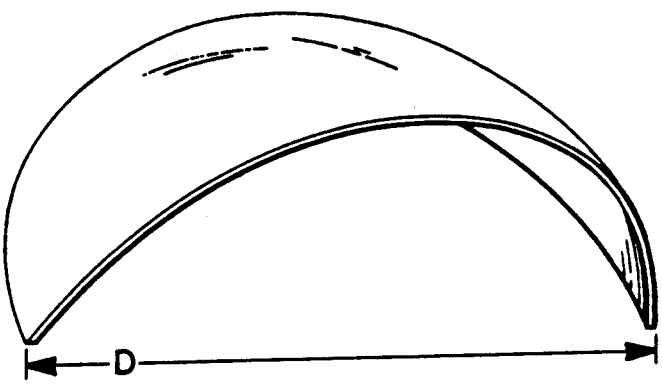
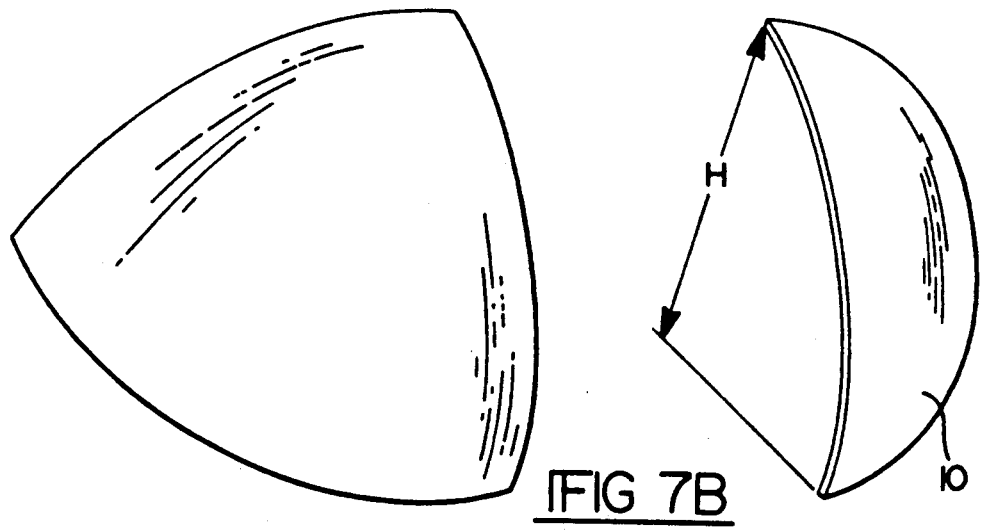
FIG 7B

VEHICULAR MIRROR

This is a continuation-in-part of application Ser. No. 254,027, now U.S. Pat. No. 4,938,578 entitled "Truncated Mirror Surface", which was filed in the United States Patent Office on Oct. 6, 1988, the disclosure of which is herein incorporated by reference.

FIELD OF THE INVENTION

The present invention relates to a mirror assembly having a convex mirror surface for mounting onto large vehicles, including but not limited to trucks, buses, trailers, boats, cars, station wagons, trains, recreational vehicles, aircraft, boats, and small aircraft, and more particularly, to a mirror being in the general shape of a quadratic surface.

BACKGROUND ART

Large vehicles, particularly trucks and trailers, which do excessive amounts of highway driving require a clear field-of-view along both sides of the vehicle. This is particularly critical for the passenger side of the vehicle. The driver can always turn his head and look over his left shoulder to view objects alongside the left side of his vehicle, if necessary.

While driving in congested freeway trafic, and while transporting huge masses of material and traveling at speeds near to or exceeding the allowable speed limits, the driver must make decisions quickly concerning the movement of his vehicle based upon the information provided to him by these mirrors. It is critical that the driver have a full field-of-view of vehicles in adjacent lanes when it is necessary for his vehicle to change lanes. Although current laws generally require mirrors disposed along both sides of large vehicles, the size and shape of such mirrors vary considerably, providing the driver with a different field-of-view depending upon the mirror used.

U.S. Pat. No. 4,436,372, entitled "Elliptical Mirror for Vehicular Use", by W. P. Schmidt and F. D. Hutchinson, discloses a major advance in improving the field of view of drivers of large vehicles, such as school busses. By employing a pair of ellipsoidal mirrors on the front of the vehicle, blind spots around the vehicle can be substantially reduced.

A variation of this design is disclosed in patent application Ser. No. 254,027 referenced above, where the elliptical mirror of U.S. Pat. No. 4,436,372 is bisected along a horizontal axis generating a half-ellipsoidal surface. Since this surface is smaller than the full ellipsoidal mirror, the size of the blindspot behind the mirror is reduced. The top portion of the elliptical mirror that is removed when the surface is bisected generally discloses objects that are disposed over the driver. It is generally not necessary to view these objects to maneuver the vehicle.

However, there is a need for a rear-view mirror which provides an enlarged field-of-view of objects adjacent to and behind the vehicle, and which is not so large as to obstruct the driver's visibility of objects located behind the mirror.

SUMMARY OF THE INVENTION

The present invention provides a mirror assembly which overcomes all of the above-identified disadvantages of previously known mirror assemblies, providing an improved field-of-view while minimizing the size of the blind spot behind the mirror.

The mirror of the present invention is in the shape of a quadratic surface, and preferably an ellipsoid. The ellipsoidal shape of the mirror is used since it is similar to the shape of the human cornea. The relative minor distortion viewed in ellipsoidal-shaped mirrors is easily compensated for by the human brain, since the brain routinely makes similar compensations for objects viewed by the ellipsoidal-shaped human eye.

The top portion of the ellipsoid-shaped mirror of U.S. Pat. No. 4,436,372 which provides a field-of-view of objects disposed over the driver is removed. The portion of the ellipsoidal-shaped mirror displaying the front of the vehicle is also removed: the right half of the surface is removed if the mirror is to be positioned on the driver's side of the vehicle and the left half of the surface is removed if the mirror is to be positioned on the passenger's side of the vehicle. Hence, the remaining portion of the ellipsoid can be effectively enlarged, while still providing a reduction in the size of the mirror blindspot. The overall size of the mirror is more effectively utilized in this new design by providing the driver with an expanded field-of-view along the side of the vehicle. The mirror, when properly mounted and aligned, provides the driver of the vehicle with a field-of-view which is greater than the angle of the ellipsoid about a vertical axis. The combination of two mirrors, one mounted on each front side of the vehicle, enables the driver to see along both sides of the vehicle without turning his head.

The surface of the mirror of the present invention is generally a convex curvature, and is triangular in shape. The mirror is in the shape of a portion of a quadratic surface, and is formed by the intersection of two non-parallel planes with the quadratic surface. Preferably, the two planes are normal to each other, and to the axes of the quadratic surface, and one of the planes bisects the quadratic surface. The mirror surface has a variable radius of curvature.

Although the quadratic surface may be a sphere, a paraboloid, or a cone, the quadratic surface is preferably in the shape of an ellipsoid. As used herein the term "ellipsoid" refers to any closed geometric shape, the shape having a section which is essentially elliptical in shape.

The diameter of the mirror disclosed in U.S. Pat. No. 4,436,372 is preferably about eight (8) inches. The preferred diameter of the mirror of the present invention is about eighteen inches, whereby the mirror width is about nine inches. By changing the shape of the reflective surface from an ellipsoid (U.S. Pat. No. 4,436,372) to a quarter-ellipsoid and eliminating the view of the front portion of the vehicle, it is possible to enlarge the mirror without increasing the size of the blind spot.

The mirror assembly is preferably mounted onto the fender of the vehicle, but may be easily adapted to any other convenient part of the vehicle, such as a door panel, or a side panel.

For a more complete understanding of the vehicular mirror assembly of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 depicts a perspective view of the preferred embodiment of the mirror assembly of the present invention;

FIG. 2 depicts an assembly view depicting the assembly mounting surface, the reflecting surface, and the mounting rim of the mirror assembly as depicted in FIG. 1;

FIG. 7A depicts the full ellipsoid surface, and the portion that forms the mirror surface of the present invention; and FIG. 7B depicts the ellipsoid of FIG. 7A as truncated by the two planes.

DETAILED DESCRIPTION OF THE PREFERRED EMBODIMENT

Figure 5:
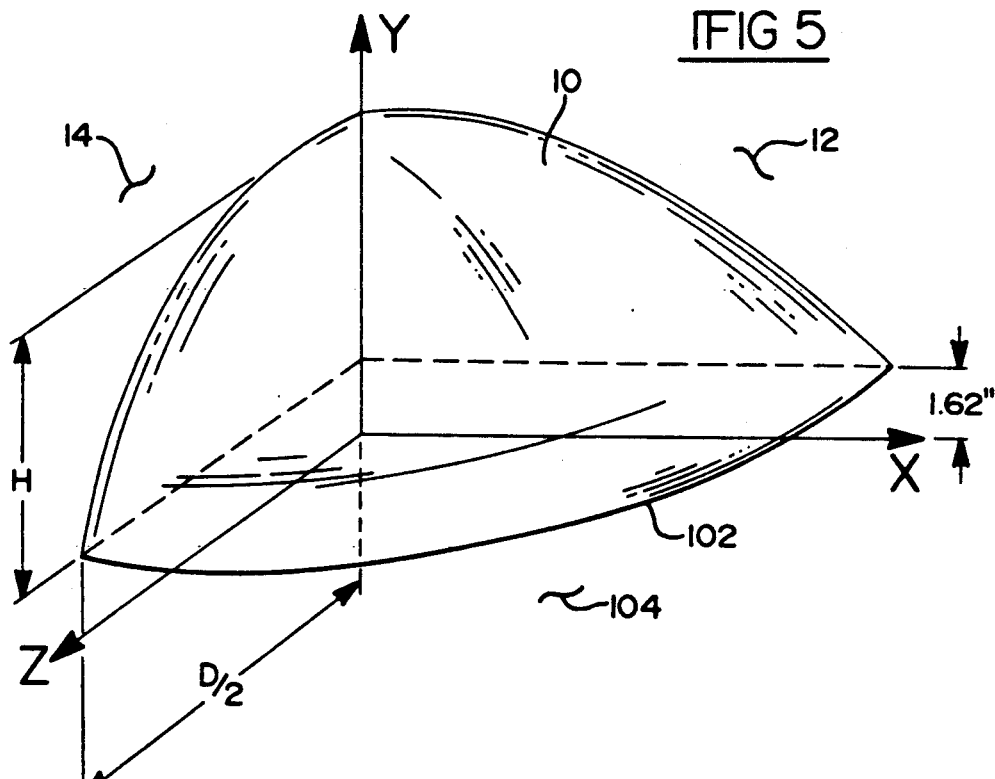
FIG. 5 represents a mathematical depiction of the ellipsoid of the preferred embodiment, with the three imaginary planes depicted in reference to the X-axis, Y-axis, and Z-axis, the planes intersecting the ellipsoid to generate the mirror of the present invention.

Referring now to the drawings, FIG. 1 depicts the mirror assembly 20 of the present invention comprising the mirror 10, the mirror frame 60, and the mounting mean 55. FIG. 5 depicts the mirror 10 having a circular peripheral edge 102 defining a diametrical plane 104, with an outer diameter D. The outer surface has a height extending a distance H from the diametrical plane 104. Generally, the distance H is perpendicular to the diametrical plane 52. The ratio of the outer diameter D to the distance H are preferably in the range of 2.5 to 3.0. The preferred D/H ratio is 2.7234, with D being 18.0 inches and H being 6.6094 inches. H may vary from 6.0 to 7.2 inches.

The convex outer surface for a similar mirror having an eight inch diameter having a varying radius of curvature, may be generally described mathematically, for purposes of illustration only, by the following equation:

$$Y = 3.72 + 0.06989X - 0.33349X^2 + 0.31664X^3 - 0.20723X^4 + 0.060985X^5 - 0.0067937X^6$$

The diameter D of the mirror 10 of the present invention is preferably about eighteen inches, so that the preferred width of the mirror 10 is about nine inches. The mirror 10 is the portion of the curve where Y varies from 1.62 inches to 8.37 inches. The ellipsoidal convex mirror surface has its focal points located on the diametrical plane of the major axis. One focal point is located at $X = +6.75$ inches, and the other focal point is located at $X = -6.75$ inches. The mirror 10 has a six-and-three-quarter inch depth of curvature.

The mirror surface 10 formed from a half of a quadratic surface which is preferably in the shape of an ellipsoid. The surface is generated by truncating the ellipsoid with two planes, each plane preferably being normal to the other plane. The first plane 12 is disposed at $Z = 0$, and the second plane 14 is disposed at $X = 0$. The mirror surface 10 depicted in FIG. 5 has the rear portion removed $Y = 1.62$ inches from the origin.

The top portion of the ellipsoid which provides a field-of-view over the driver, and the side portion of the ellipsoid which provides a field of view of the front of the vehicle are eliminated from the mirror surface of the present invention. Hence, the portion of the ellipsoid that remains, which enables the driver to view alongside the vehicle, can be effectively enlarged, while still providing a reduction in the size of the blindspot behind the mirror 10 (see FIG. 7A).

FIGS. 1 through 4 depict a series of perspective views of the mirror assembly 20 of the present invention, utilizing the mirror 10 already defined. The mirror assembly also includes a tubular member 30, a mirror bracket 40, and a vehicle bracket 50. The mirror 10 has a reflective surface with a generally convex shape throughout. The mirror bracket 40 is secured to the backside of the mirror 10. A tubular member 30 is attached to the vehicle 11 by the vehicle bracket 50. The mirror 10 is asymmetrical about a horizontal axis, and is preferably mounted onto the right front surface of a vehicle 11. Two of the mirror assemblies 20 may be mounted on the vehicle 11; one on the right front fender, and the other on the left front fender in such a manner to enable the driver to view both sides of his vehicle 11.

The mirror shown in these FIGS. 1 through 4 is the mirror for mounting on the passenger's side of the vehicle 11. The shape of the mirror 10 for mounting on the left side (the driver's side) of the vehicle is the portion that is removed from the half-ellipsoid by the vertical plane. The mirror surface 10 depicted in FIG. 5 is for mounting on the left side of the vehicle 11.

Figure 3:
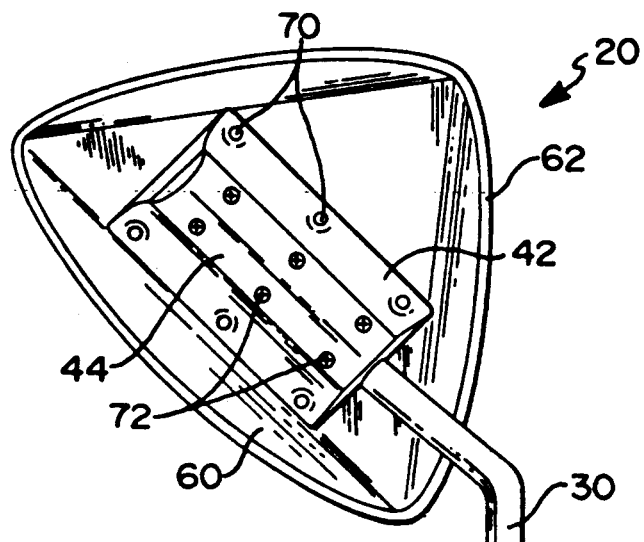
FIG. 3 is a rear perspective view of the mirror assembly shown in FIG. 1, depicting the tubular member, the mounting frame, and the mounting bracket.
Figure 4:
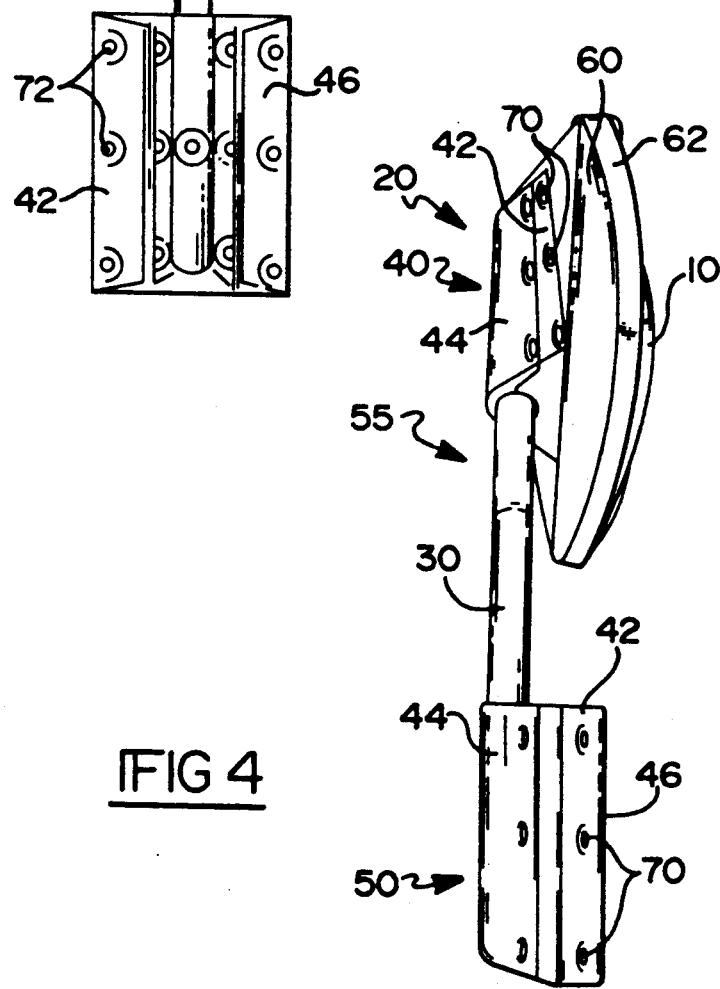
FIG. 4 is a side perspective view of the mirror assembly shown in FIG. 1, depicting the mounting frame and the mounting bracket.

As shown in FIGS. 3 and 4, which are perspective views depicting the mirror assembly of FIG. 1, the mirror 10 has a transparent outer surface 17 formed thereon. Preferably, the transparent outer surface 17 is made of acrylic plastic. The transparent surface 17 is about 0.125 inches thick. The mirror 10 has a curved inner liner which is coated with a light reflective coating, such as about 0.7 mils thick to form a convex light reflecting surface. The light reflective coating may be formed by aluminum deposition on the inner liner.

The mirror 10 of the present invention has a generally convex shape. The mirror 10 is in the shape of a portion of a quadratic surface. The mirror 10 is formed by the intersection of each of two planes 12 and 14 with the ellipsoidal surface. Each plane 12 and 14 is preferably normal to the other plane, and one of the planes bisects the ellipsoid. The mirror surface 10 is in the shape of a convex triangle, having a variable radius of curvature. The diameter D of the reflective surface is normal to the height H of the reflective surface. The reflective surface provides the driver with a field of view which is greater the angle of the quadratic reflective surface about a vertical axis. The angle shown is about 90%, and the field-of-view of the reflective surface along the vertical axis is up to 110°.

Although the quadratic surface may be a sphere, a paraboloid, or a cone, in the preferred embodiment the quadratic surface is an ellipsoid. It has been found that an ellipsoid provides a full field of view with minimal distortion. As used herein the term "ellipsoid" refers to any closed geometric shape, the shape having a section which is essentially elliptical in shape.

In addition to the mirror 10, the mirror assembly 20 also includes a frame 60 which houses the mirror. The frame 60 has a flange 62 extending continuously beyond and around the outer portion of the mirror 10. The flange 62 is preferably formed with the same material as the outer surface and is integrally formed with the body of the mirror 10. The flange 62 is preferably coated with a rubber or vinyl.

The mirror 10 produces a continuous image to a viewer who is positioned in alignment therewith, which is larger in the center and smaller near the edges thereof. The mirror 10 produces no severe distortion and the viewer is able to interpret the image formed thereon and overcome the partial distortions caused by the different radii of curvature. The mirror 10 is mounted with a slight upward tilt. The tilt enables the flat top surface of the mirror 10 to be in substantial alignment with the line of sight of the driver.

Figure 6:
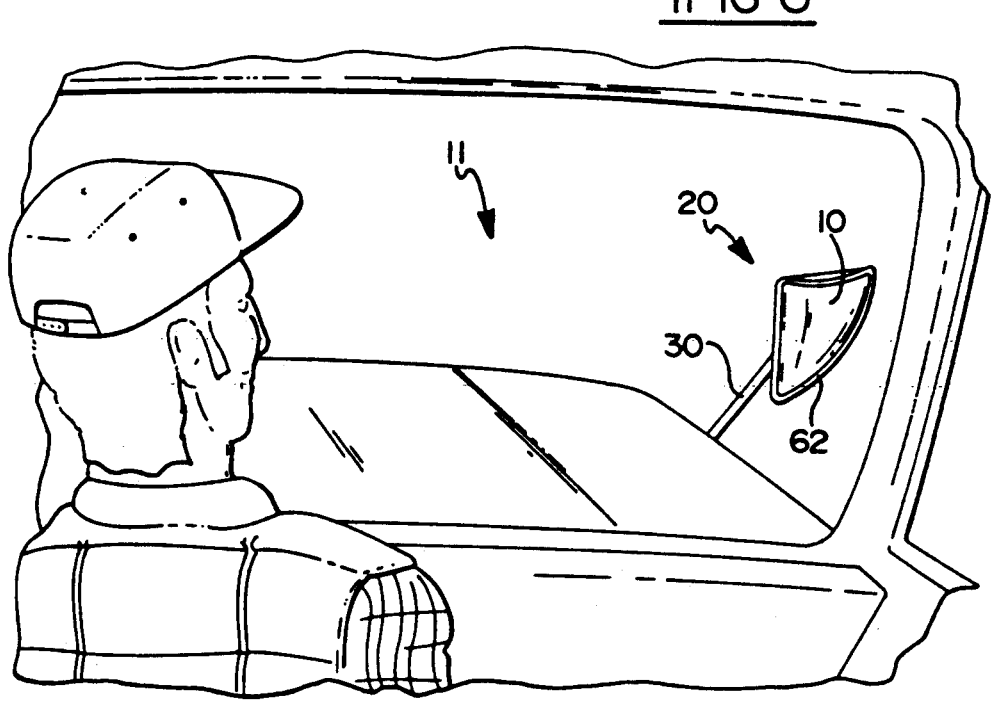
FIG. 6 is a perspective view of the mirror assembly shown in FIG. 1, mounted on the vehicle relative to the driver.

The rigid tubular member 30 is attached to the mirror 10 by means of a mirror bracket 40, and to the vehicle 11 by means of a vehicle bracket 50. The tubular member 30 extends above the vehicle 11 in such a manner that the mirror 10 is visible to the driver when the driver is seated in a position behind the steering wheel (see FIG. 6).

The mounting means 55 comprises the tubular member 30, the mirror bracket 40, and the vehicular bracket 50. The mirror bracket 40 and the vehicle bracket 50 are preferably the bracket described in U.S. Pat. No. 4,500,063 entitled "Fender Mount for a Mirror", by W. P. Schmidt and F. D. Hutchinson.

The vehicular mounting bracket 50 includes a base member 42 and a cover member 44. The base member 42 has a mounting surface 46 and an opposed outer surface 48. The mounting surface 46 of the base member is secured to the curved front portion of the fender of the vehicle 11. The cover member 44 is secured to the outer surface 48 of the base member. The base member 42 and the cover member 44 define a longitudinal bore 52 therebetween for securing the lower end of the tubular member 30. The longitudinal bore 52 accepts and secures the tubular member 30. The cover member 44 is adjustable relative to the base member 42 to enable a repositioning of the tubular member 30 therebetween.

The vehicular mounting bracket 50 can similarly be used for securing to flat surfaces, such as the back of the mirror 10 by using a base member 42 having a flattened mounting surface. The vehicular mounting bracket 50 is preferably used to attach the mirror frame 60 to the tubular member 30 as shown in FIG. 4.

To affix the vehicular mounting bracket 50 either to the vehicle 11 or to the frame 60, the base member 42 is located thereon in the desired position, and secured thereto by threaded fasteners 70 which are inserted into apertures 72 disposed therein. The tubular member 30 is then inserted into the longitudinal bore 52 within the base member 42. The cover member is then inserted onto the base member and the tubular member, the longitudinal bore 52 in the cover member 44 cooperating with the opposed longitudinal bore in the base member 42 to secure the tubular member 30, as additional threaded fasteners 70 are secured into additional apertures 72 in the cover member 44.

While the vehicular mirror assembly has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

We claim:

1. A mirror for mounting onto a vehicle which provides a field-of-view about a vertical axis, the mirror comprising:

a quadratic reflective surface having a generally convex shape throughout, the quadratic reflective surface having a height and a diameter, the height being normal to the diameter, the quadratic reflective surface having a first radius of curvature and a second radius of curvature, the first radius of curvature being different from the second radius of curvature, the quadratic reflective surface being bordered by a first flange and a second flange and a third flange, the quadratic reflective surface providing the driver of the vehicle with a field-of-view that is greater that the angle subtended by the quadratic reflective surface about the vertical axis.

2. The mirror of claim 1, wherein the first flange generally defines a first plane, the second flange generally defines a second plane, and the third flange generally defines a third plane, the first plane being substantially normal to the second plane, the second plane being substantially normal to the third plane and the first plane being substantially normal to the third plane.

3. The mirror of claim 1, wherein the quadratic reflective surface is an ellipsoid.

4. A mirror for mounting onto a vehicle which provides a field-of-view about a vertical axis, the mirror comprising:

a quadratic reflective surface having a generally convex shape throughout, the quadratic reflective surface having a height and a diameter, the height being normal to the diameter, the quadratic reflective surface being in the general shape of part of an ellipsoid the quadratic reflective surface being bordered by a first flange and a second flange and a third flange, the first flange generally defining a first plane, the second flange generally defining a second plane, and the third flange generally defining a third plane.

5. The mirror of claim 4, wherein the first plane is substantially normal to the second plane, the second plane is substantially normal to the third plane, and the first plane is substantially normal to the third plane.

6. The mirror of claim 4, wherein the quadratic reflective surface provides a driver of the vehicle with a field-of-view that is greater than the angle subtended by the quadratic reflective surface about the vertical axis.

7. The mirror of claim 4, wherein the quadratic surface has a first radius of curvature and a second radius of curvature, the first radius of curvature being different from the second radius of curvature.

8. A mirror assembly for mounting onto a vehicle which provides a field-of-view about a vertical axis, the mirror assembly comprising:

(a) a mirror having a generally convex shape throughout, the mirror being in the shape of a quadratic reflective surface, the quadratic reflective surface having a first radius of curvature and a second radius of curvature, the first radius of curvature being different from the second radius of curvature, the quadratic reflective surface being bordered by a first flange and a second flange and a third flange,;

(b) a frame which houses the mirror; and (c) means for mounting the frame and the mirror to the vehicle;

wherein the quadratic reflective surface provides the driver of the vehicle with a field-of-view that is greater than the angle subtended by the quadratic reflective surface about the vertical axis.

9. The mirror assembly of claim 8, wherein the quadratic reflective surface has a height and diameter, the height being normal to the diameter.

10. The mirror assembly of claim 8, wherein the quadratic surface is an ellipsoid.

11. The mirror assembly of claim 8, wherein the first plane is substantially normal to the second plane, the second plane is substantially normal to the third plane, and the first plane is substantially normal to the third plane.

12. The mirror assembly of claim 8, wherein the quadratic reflective surface is mounted to the vehicle in such a manner that one of the flanges is disposed in an essentially horizontal orientation.

13. A mirror assembly for mounting onto a vehicle which provides a field-of-view about the vehicle, the mirror assembly comprising:

(a) a mirror being bordered by a first flange and a second flange and a third flange, the first flange generally defining a first plane, the second flange generally defining a second plane, and the third flange generally defining a third plane, the first plane being substantially normal to the second plane, the second plane being substantially normal to third plane, the first plane being substantially normal to the third plane, the quadratic reflective surface having a first radius of curvature and a second radius of curvature, the first radius of curvature being different radius of curvature, the first radius of curvature being different from the second radius of curvature;

(b) a frame to the mirror; and (c) means for mounting the frame and the mirror to the vehicle.

14. The mirror assembly of claim 13, wherein the quadratic surface is an ellipsoid.

15. The mirror assembly of claim 13, wherein the mirror is generally mounted to the vehicle in such a manner that one of the flanges of the quadratic surface is disposed in an essentially horizontal orientation.

16. The mirror assembly of claim 13, wherein the quadratic reflective surface provides the driver of the vehicle with a field-of-view that is greater than the angle subtended by quadratic reflective surface about the vertical axis.

* * * * *